United States Patent [19]

Komatsu et al.

[11] Patent Number: 4,791,032

[45] Date of Patent: Dec. 13, 1988

[54] MAGNETIC RECORDING MEDIA AND PROCESS OF FABRICATING

[75] Inventors: Kazunori Komatsu; Tsunehiko Sato, both of Kanagawa, Japan

[73] Assignee: Fuji Photo Film Co., Ltd., Kanagawa, Japan

[21] Appl. No.: 131,688

[22] Filed: Dec. 11, 1987

[51] Int. Cl.$^4$ ............................................. H01F 10/02
[52] U.S. Cl. ..................................... 428/694; 427/48; 427/128; 427/289; 428/900
[58] Field of Search .................. 427/48, 128, 289; 428/694, 900

Primary Examiner—Bernard Pianalto
Attorney, Agent, or Firm—Sughrue, Mion, Zinn, Macpeak, and Seas

[57] ABSTRACT

A process for fabricating a magnetic recording medium such as a disk medium having a uniformly high degree of magnetic particle randomization. The process includes steps of: forming a magnetic layer by applying a magnetic liquid to a continuously running support, and randomly orienting the magnetic layer by applying an AC magnetic field thereto while the magnetic layer is wet. The randomizing step is accomplished such that the magnetic field intensity of the applied AC magnetic field is 1/10 to 1/1 of the magnetic coercive force of the magnetic particles of the magnetic layer, and the frequency (Hz) of the field is set with respect to the running rate of the magnetic layer through the magnetic field so as to form a ratio to the application rate (m/min) within a range of 1/10 to 1/1.

3 Claims, 3 Drawing Sheets

MAGNETIC RECORDING MEDIA AND PROCESS OF FABRICATING

BACKGROUND OF THE INVENTION

The present invention relates to a process for fabricating a magnetic recording medium and, more particularly, to a magnetic recording medium fabricating process suitable for use in fabricating a disk-type medium such as a floppy disk.

Generally, a magnetic recording medium such as a magnetic disk or tape is fabricated by applying magnetic liquid containing ferromagnetic fine particles dispersed in a binder dissolved in a solvent to a band-shaped nonmagnetic support continuously run in the longitudinal direction of the support subsequently drying and solidifying the magnetic liquid, and then punching or cutting the nonmagnetic support to the desired shape.

If, however, ferromagnetic fine particles are arrayed in a specific direction during fabrication of the magnetic disk so that the magnetic recording medium is magnetically anisotropic, the magnetic and electric characteristics in various directions on the disk will also be anisotropic. For example, let it be assumed that the magnetic particles are arrayed in the magnetic liquid application direction, that is, in the delivery direction of the nommagnetic support. In use, if the magnetic head scans not linearly but circumferentially in a concentric pattern, the signal level of the reproduced output in the application direction is higher than in other directions. As a result, the signal level of the reproduced output from the magnetic disk will vary as the disk rotates. (This is generally termed the "modulation" phenomena). Especially in case where the thickness of the magnetic layer varies, this effect is more pronounced.

Therefore, for the manufacture of magnetic disks or the like, there has been employed in the prior art a method of randomizing the orientation of the magnetic particles by impressing a magnetic field or the magnetic liquid before the liquid dries so as to prevent the particles from being oriented in some specific direction. Such a method of applying a magnetic field to the magnetic liquid before it dries using an AC magnetic field is disclosed in Japanese Laid-Open Patent Application No. 57-198545.

Moreover, it has been found that the aforementioned process of applying an AC magnetic field is influenced by the liquid composition and the application rate of the liquid, and that the degree of randomization is reduced if the liquid composition and the application rate vary. Even for liquids of supposedly identical compositions, the magnetic conditions for complete randomization vary with delicate variations of the dispersed state of the magnetic power, the magnetic characteristics of the magnetic power, etc., making it very difficult to achieve stable randomization.

The causes for these problems have been investigated by the inventors. As to the first problem, it has been found that there is an optimum frequency for each liquid composition and application rate (i.e., support running speed). That is, it has been discovered that an excessively high frequency restricts the amount of motion of the magnetic particles in the magnetic materials, making it difficult to follow the variations of the magnetic field, and resulting in an orientation of the particles in a perpendicular direction (i.e., transverse direction with respect to the longitudinal direction in which the magnetic field is applied) to the direction of application of the magnetic field. On the other hand, an excessively low frequency causes the particles to be oriented in the direction of application of the magnetic field. Furthermore, as to the second problem, it has been found that maximum randomization takes place at a specific matching point between the liquid composition and the intensity of the magnetic field, and that the degree of randomization is susceptible to delicate variations of the liquid properties such as the dispersion state or the magnetic characteristic of the magnetic power.

SUMMARY OF THE INVENTION

It is, therefore, an object of the present invention to provide a process for fabricating a magnetic recording medium such as an application type disk medium having high-quality characteristics.

The various investigations discussed above carried out by the applicants have uncovered the fact that a high degree of randomization is achieved within a wide intensity range of magnetic field (e.g., a ratio of 1/10 to 1/1 of the magnetic coercive force of the magnetic materials) if the optimum frequency for the magnetic field is employed, taking into account the liquid composition and application rate. More specifically, a magnetic recording medium of high quality can be fabricated with a very high degree of randomization using an AC magnetic field generator having a frequency variable in accordance with the running speed of the magnetic layer (i.e., application rate of the liquid) through a magnetic field by maintaining a frequency (Hz) and the application rate (m/min) ratio in a range to 1/10 to 1/1.

More specifically, according to a major feature of the present invention, there is provided a process for fabricating a magnetic recording medium comprising the steps of: forming a magnetic layer by applying a magnetic liquid to a continuously running support, and randomly orienting said magnetic layer by applying an AC magnetic field thereto while said magnetic layer is wet, wherein the randomizing step is accomplished such that the magnetic field intensity of said AC magnetic field is 1/10 to 1/1 of the magnetic coercive force of the magnetic materials, and such that the frequency (Hz) of the applied filed is set with respect to the running rate of said magnetic layer through said magnetic field so as to form a ratio between said frequency (Hz) and the application running rate (m/min) within a range of 1/10 to 1/1.

BRIEF DESCRIPTION OF THE DRAWINGS

Other objects, features and advantages of the present invention will become apparent from the following description taken in conjunction with the accompanying drawings, in which.

DESCRIPTION OF THE PREFERRED EMBODIMENT

Figure 1:
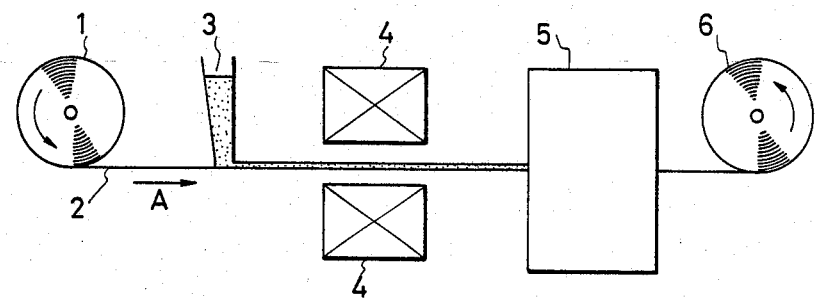
FIG. 1 is a schematic view showing an apparatus for fabricating a magnetic recording medium using the process of the present invention.

In FIG. 1, showing an apparatus for fabricating a magnetic recording medium in accordance with the process of the present invention, a long band-shaped nonmagnetic support 2 wound on a supply roll 1 is continuously delivered in the direction of an arrow A until the point where it is wound up by a take-up roll 6. In the vicinity of the surface of the nonmagnetic support band 2, there is arranged an applicator 3 for applying a magnetic liquid thereto.

Downstream of the applicator 3, in the support band running direction A, there is arranged variable-frequency AC magnetic field generator 4 for applying a magnetic field for effecting randomization. A dryer 5 is arranged further downstream.

In the apparatus thus constructed, a magnetic liquid layer on the nonmagnetic support band 2 has its magnetic particles oriented at random before it is dried by the variable-frequency AC magnetic field generator 4. The frequency (Hz) of the magnetic field produced by the generator 4 is set within a range of 0.1 to 1 with respect to the running speed (m/min) of the support band 2 through the magnetic field generator 4. Moreover, the intensity of the AC magnetic field is set within a range of 0.1 to 1 with respect to the magnetic coercive force of the magnetic materials.

After this randomization process, the applied magnetic layer on the nonmagnetic support band 2 is dried and solidified by the dryer 5 to form a belt-shaped magnetic recording medium. This magnetic recording medium can then be punched or cut to form a magnetic disk or the like.

In the magnetic field generator 4 described above, the intensity of the applied magnetic field is set within a predetermined range with respect to the magnetic coercive force of the magnetic particles in the magnetic liquid, and the frequency of the current for generating the alternating magnetic field is set within a predetermined range with respect to the application rate. With the invention, due to a combination of these two effects random orientation of the magnetic particles can easily be effected with significantly less influence by various other characteristics of the applied liquid, such as the dispersion state or the magnetic characteristics of the magnetic particles. That is, the first factor (range of intensity of the magnetic field) ensures that the magnetic field strength will be sufficient to effect the desired degree of randomization, while the second factor (the frequency to running rate ratio) ensures that the frequency of the applied field will not be such as to inhibit randomization. With the process of the invention, no region in which the orientation ratio (i.e., the SQ ratio) is extremely reduced will be present, and an orientation ratio of essentially unity can be achieved.

As used herein, the "SQ ratio" is intended to mean the ratio between the rectangular ratio $SQ\|$ in the longitudinal direction of the magnetic layer and the rectangular ratio $SQ\perp$ in the perpendicular direction, i.e., $SQ = SQ\perp / SQ\|$.

The time period for magnetic field application is not be especially limited, and it can be appropriately varied depending upon the intensity of the magnetic field and the running speed of the support band, for example.

Accordingly, with the process of the present invention, a magnetic recording medium of very stable quality can be provided.

EXAMPLES

The present invention will be described in more detail in connection with specific examples thereof.

A magnetic liquid suitable for attaining a dried thickness of 2 μm was applied to a nonmagnetic support made of polystyrene terephthalate having a thickness of 75 μm. The magnetic particles were then randomized by a magnetic field produced by a variable-frequency magnetic field generator 4 arranged downstream in the running direction of the nonmagnetic support. The nonmagnetic support was then dried and punched to fabricate a magnetic disk.

Various magnetic disks were fabricated in which the differences in the degree of randomization (SQ ratios) of the magnetic particles were measured for frequencies of 5 Hz, 50 Hz and 100 Hz and for running rates of 50 m/min and 100 m/min. (Complete randomization is achieved when the SQ ratio is unity.)

In the present example, two types of liquids, A and B, of different compositions were used. The compositions of the two liquids are shown in the following Tables 1 and 2:

TABLE 1

| (Liquid A) | |
| --- | --- |
| γ-Fe$_2$O$_3$ (Anti-Magnetic Force of Magnetic Materials: 240 Oe) | 400 wt. parts |
| Polyurethane (Nipporan 3022) | 60 wt. parts |
| Vinyl Chloride-Vinyl Acetate Copolymer (VMCH) | 40 wt. parts |
| Lecithin | 6 wt. parts |
| Stearic Acid | 5 wt parts |
| Carbon | 30 wt. parts |
| Methyl Ethyl Ketone | 500 wt. parts |
| Methyl Isobutyl Ketone | 200 wt. parts |
| Cyclohexanone | 200 wt. parts |

TABLE 2

| (Liquid B) | |
| --- | --- |
| Co Containing γ-Fe$_2$O$_3$ (Anti-Magnetic Force of Magnetic Material: 600 Oe) | 100 wt. parts |
| Nitrocellulose | 10 wt. parts |
| Polyurethane (Nipporan 2304) | 8 wt. parts |
| Polyisocyanate | 8 wt. parts |
| Cr$_2$O$_3$ | 2 wt. parts |
| Carbon | 2 wt. part |
| Stearic Acid | 1 wt. part |
| Butyl Stearate | 1 wt. part |
| Methyl Ethyl Ketone | 300 wt. parts |

Figure 2:
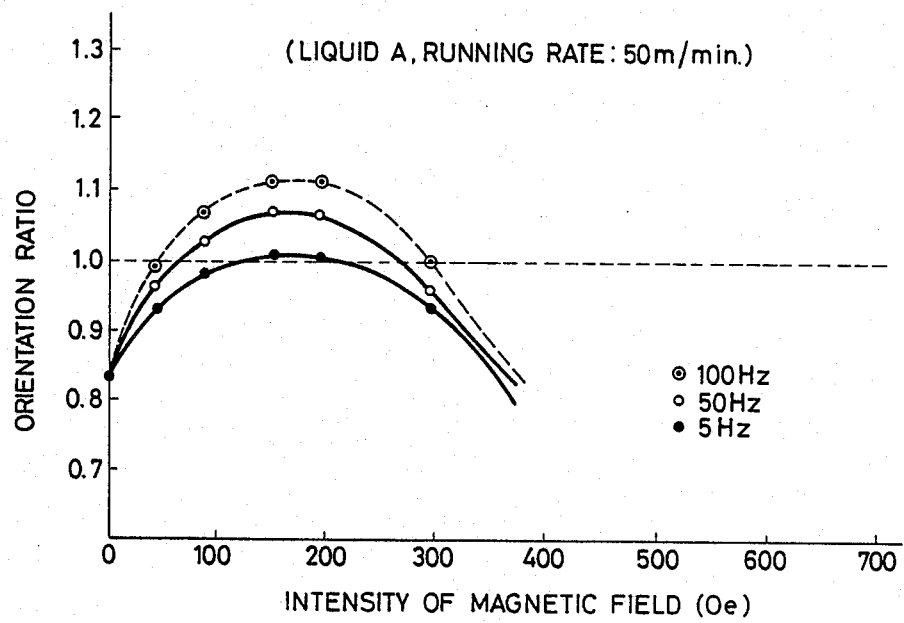
FIGS. 2 to 5 are graphs presenting results of examples illustrating the present invention.
Figure 3:
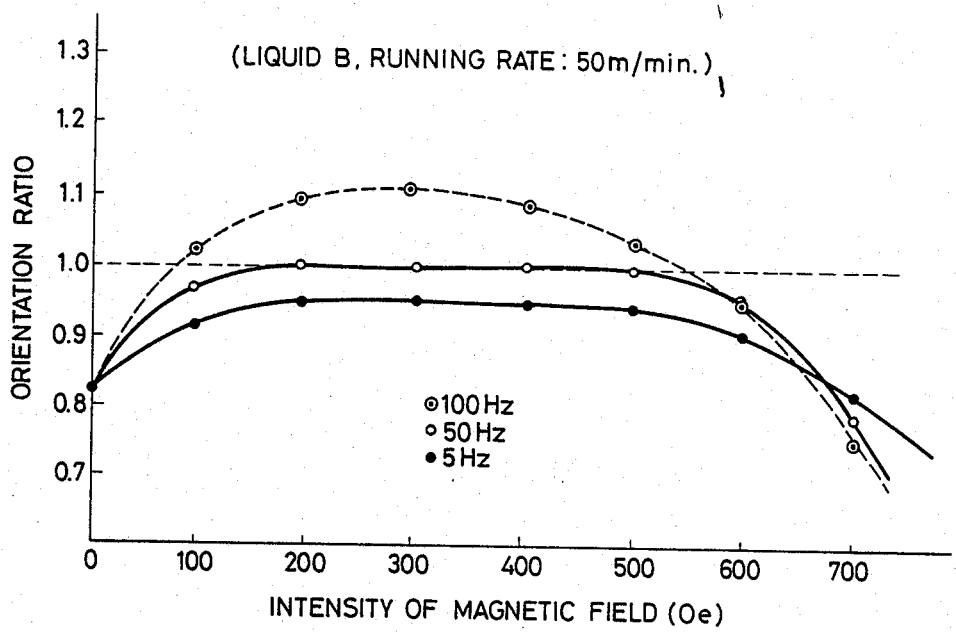
Figure 4:
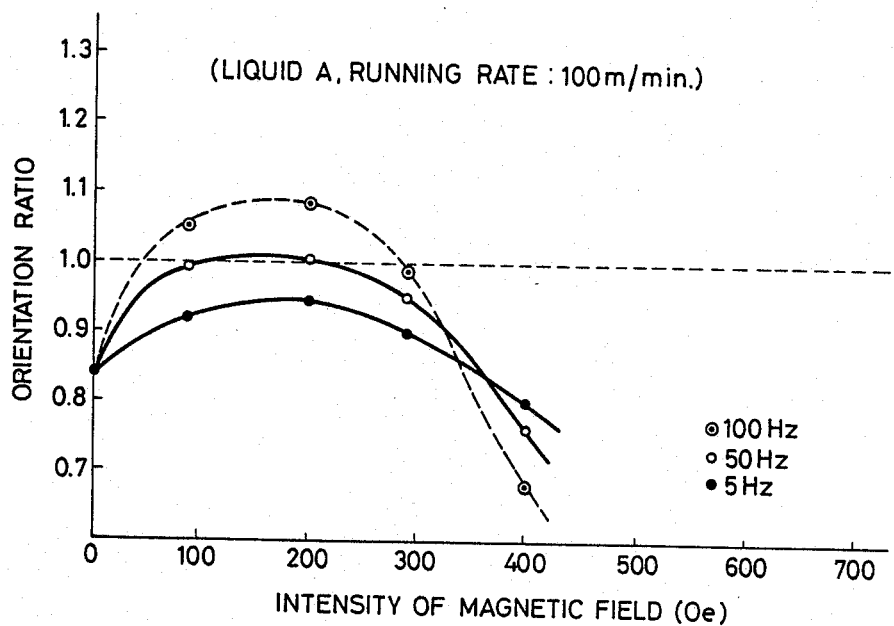

The orientation (SQ) ratios of magnetic disks which were randomized by the variable frequency AC magnetic field generator are plotted against the intensity of the magnetic field in FIGS. 2 through 5. FIGS. 2 and 3 correspond to the case in which the running rate was 50 m/min, and FIGS. 4 and 5 correspond to the case in which the running rate was 100 m/min.

In view of the results for the liquid A depicted in FIG. 2, for example, there exist for the frequencies 100 and 50 Hz two points at which the orientation ratio assumes the value of one. Hence, if the parameters for these two points are employed, an orientation ratio of about 1 can be achieved. Even with an identical composition, however, for the frequencies of 100 and 50 Hz, the points for the optimum magnetic field intensity shift fairly strongly as a result of delicate variations of the dispersion state of the liquid and the magnetic characteristics of the magnetic power, so that stable fabrication cannot be achieved. As is apparent through from the results for liquid A in FIG. 2, the magnetic field intensity range for an orientation ratio of one can be widened by setting the frequency at the optimum value of 5 Hz. Thus, magnetic disks of high quality can be stably fabricated by setting the magnetic field intensity in the vicinity of the center of that optimum range. It is also apparent from FIG. 4 that the optimum frequency increases (for an identical application liquid) as the application rate increases.

Figure 5:
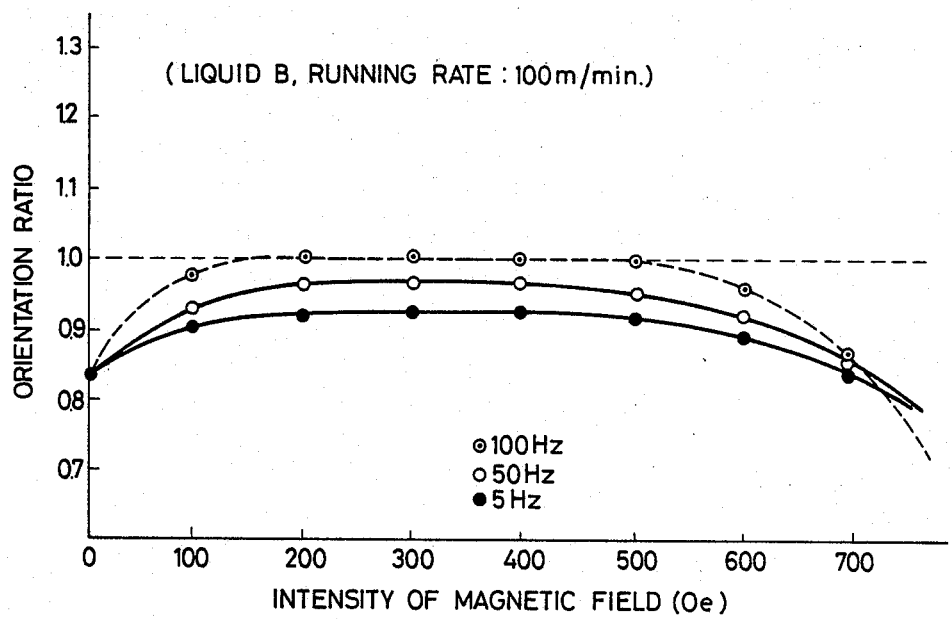

In the cases of applying the liquid B (as shown in FIGS. 3 and 5), on the other hand, the optimum frequency deviates from that of the liquid A, but generally is similar to the aforementioned case of the liquid A. Thus, the optimum frequency varies with the composition and application rate of the liquid. Thus, by employing an AC magnetic field generator having a variable frequency range wherein the ratio of the frequency (Hz) of the magnetic field to the application rate (m/min) of the liquid is maintained within a range of 1/10 to 1/1, magnetic recording media of high quality can be stably fabricated.

As has been described hereinbefore, according to the process of the present invention, by properly selecting the magnetic field intensity and the relationship between the frequency (Hz) and the application rate (m/min) of the magnetic particle containing liquid an orientation ratio of approximately unity can be maintained so that a high degree of random orientations is ensured. As a result, the use of the invention results in the stable fabrication of magnetic recording media of high quality.

What is claimed is:

1. A process for fabricating a magnetic recording medium, comprising the steps of:
    forming a magnetic layer by applying a magnetic liquid to a continuously running support; and
    randomly orienting said magnetic layer by applying an AC magnetic field to said magnetic layer while said magnetic layer is wet, wherein a magnetic field intensity of said AC magnetic field applied is within a range of 1/10 to 1/1 of the magnetic coercive force of magnetic particles in said magnetic layer, and a frequency of said magnetic field (Hz) is set with respect to a running rate (m/min) of said magnetic layer through said magnetic field so as to form a ratio between said frequency and said running rate within a range of 1/10 to 1/1.

2. The magnetic recording medium fabricating process according to claim 1, further comprising the steps of:
    drying the randomized magnetic layer; and
    punching the dried magnetic layer into a desired shape.

3. The magnetic recording medium fabricating process according to claim 1, wherein said ratio of said frequency to said running rate is maintained at a center part of said range of 1/10 to 1/1.

* * * * *